United States Patent [19]

Kowalski et al.

[11] 4,341,332
[45] Jul. 27, 1982

[54] STANCHION ASSEMBLY

[75] Inventors: Daniel J. Kowalski, Ortonville; Ray G. Mareydt, Warren, both of Mich.

[73] Assignee: Four Star Corporation, Troy, Mich.

[21] Appl. No.: 220,229

[22] Filed: Dec. 29, 1980

[51] Int. Cl.³ .............................................. B60R 9/04
[52] U.S. Cl. .................................... 224/326; 224/309
[58] Field of Search ................ 224/326, 325, 309, 316

[56] References Cited

U.S. PATENT DOCUMENTS 3,719,313  3/1973  Tischler ............................. 224/309
4,241,860  12/1980  Ingram ............................. 224/316
4,269,339  5/1981  Bott ..................................... 224/325
4,279,368  7/1981  Kowalski ........................... 224/326

Primary Examiner—Steven M. Pollard
Attorney, Agent, or Firm—Reising, Ethington, Barnard, Perry & Brooks

[57] ABSTRACT

A two-part stanchion for a vehicle article carrier wherein one part includes an integral base, wall means extending upwardly from not more than half the base periphery and a second part including wall means coacting with the first part to enclose the base.

10 Claims, 6 Drawing Figures

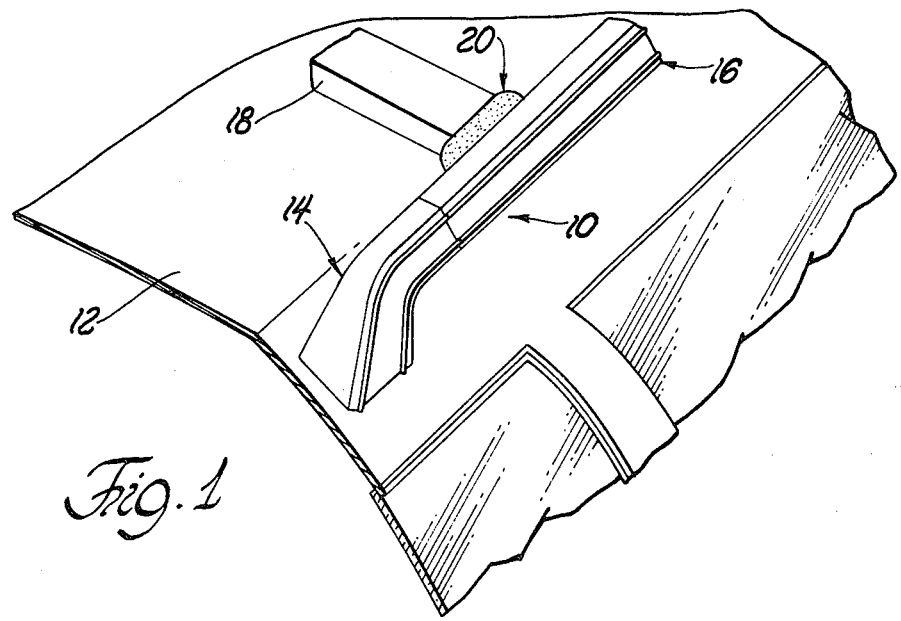
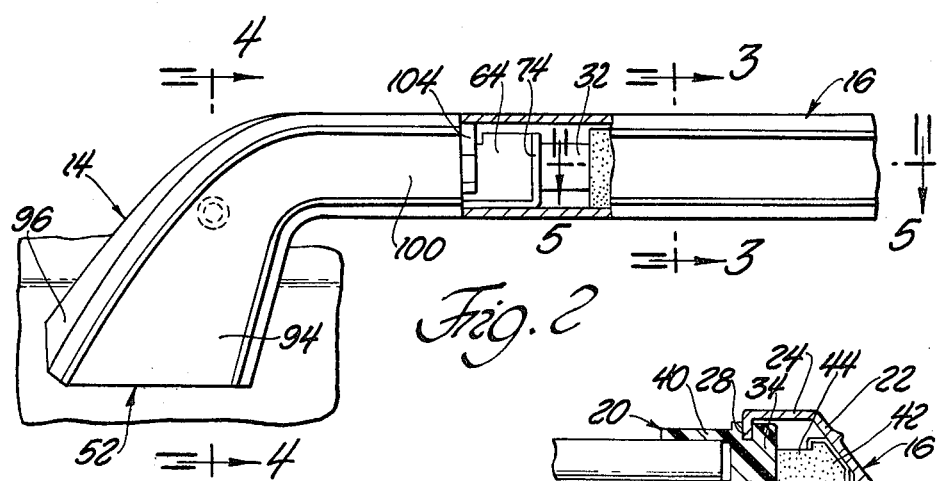
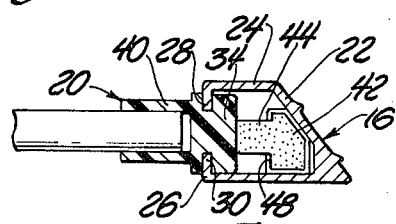
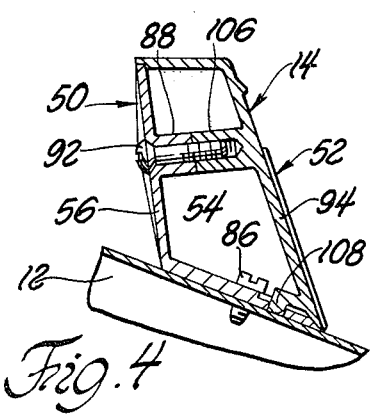
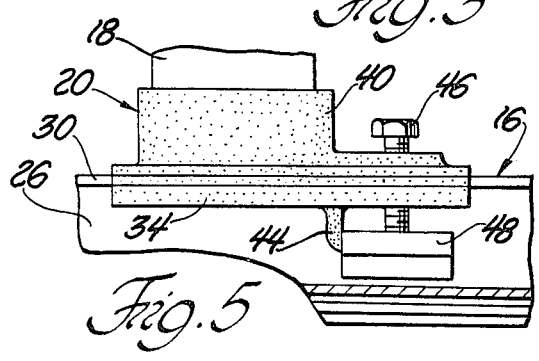

STANCHION ASSEMBLY

TECHNICAL FIELD

The invention relates to a stanchion device of the type adapted to support a longitudinal side rail for a load carrying rack assembly typically mounted on an exterior surface of a vehicle. The stanchion device of the present invention is adapted to be supported on and project upwardly from a vehicle surface, such as the roof or rear trunk deck, so as to support the longitudinal side rail above the stanchion-supporting surface.

For reasons of aerodynamics as well as enclosing the means whereby the stanchion is fastened to the vehicle surface, a new monolithic or enclosed stanchion has been developed. Such a stanchion is shown in my copending application Ser. No. 180,228 which is a continuation of my earlier filed and now abandoned application Ser. No. 019,273 filed Mar. 9, 1979.

The stanchion device of my copending application includes a first member having a base with a plurality of walls extending upwardly from all but one edge of the base leaving an open area adapted to be enclosed by a cap member to complete the enclosure of the stanchion and the means whereby the latter is secured to the vehicle surface.

The present invention includes several features which represent improvements over my earlier aforesaid copending application. Users of such stanchions prefer the monolithic and enclosed construction which reduces wind noise and turbulence as well as hiding the fastening means from view and protecting the latter from corrosion.

In order to provide a monolithic or completely enclosed stanchion which can be securely fastened to, yet be removable from, a vehicle surface, it is necessary that the stanchion be of a two-part construction. At the same time it is desired that the assembled stanchion give the appearance of being monolithic or of one-part construction. This objective creates several interrelated problems. First, the juncture between the two stanchion parts must be removed or hidden as much as possible from normal viewing. Next, the stanchion parts must coact in such a way as to permit ready access to the means for fastening the stanchion to the vehicle surface. Finally, the stanchion parts should have comparable strength.

Where the enclosed stanchion device includes a simple cover plate, as in my copending application, one or more of the aforementioned problems can arise. Accordingly, in the preferred embodiment of the present invention the stanchion device includes two members of comparable size, shape and strength. Further, the stanchion members are uniquely joined to enhance the monolithic appearance of the stanchion. Finally, the parts are so constructed as to provide easy access to the means whereby the stanchion is secured to the vehicle surface.

The present stanchion device thus includes a first section having a base adapted to be secured to the vehicle surface. The first section also includes one or more wall portions upstanding from the periphery of the base in such a way as to leave a substantial part of the base periphery unenclosed to allow ready access to the means for fastening the base to the vehicle surface. A second stanchion section includes complementary upstanding wall portions which coact with the first section to enclose the wall-less edges of the base and to overlie the edges of the first section wall portions to complete the stanchion enclosure to create a monolithic appearance.

BACKGROUND ART

In addition to my aforementioned copending application, the following are the most pertinent prior art patents of which I am aware:

U.S. Pat. No. 4,170,323 Helm
U.S. Pat. No. 4,170,322 Bott
U.S. Pat. No. 3,253,755 Bott
U.S. Pat. No. 3,841,660 Clark
U.S. Pat. No. 3,325,067 Helm Other than my copending application, none of these references relates to an enclosed or monolithic appearing, two-part stanchion wherein the stanchion mounting means is entirely enclosed within the assembled stanchion. Further, none of the prior art teachings discloses or suggests a stanchion comprising similarly shaped and comparably strong sections which coact to permit ready access to the stanchion mounting means while creating an enclosed and monolithic appearing construction.

The details of the invention will be more clearly understood by a perusal of the ensuing description and illustrative drawings.

BRIEF DESCRIPTION OF DRAWINGS

FIG. 1 is a partial assembly of a roof-mounted rack assembly including the new and improved stanchion device;

FIG. 2 is a partially sectioned side elevation view of the stanchion device and supported side rail;

FIG. 3 is a sectional view along line 3—3 of FIG. 2;

FIG. 4 is an end sectional view of the stanchion device along line 4—4 of FIG. 2;

FIG. 5 is a partially sectioned plan view along line 5—5 of FIG. 2; and

BEST MODE FOR CARRYING OUT THE INVENTION

Figure 6:
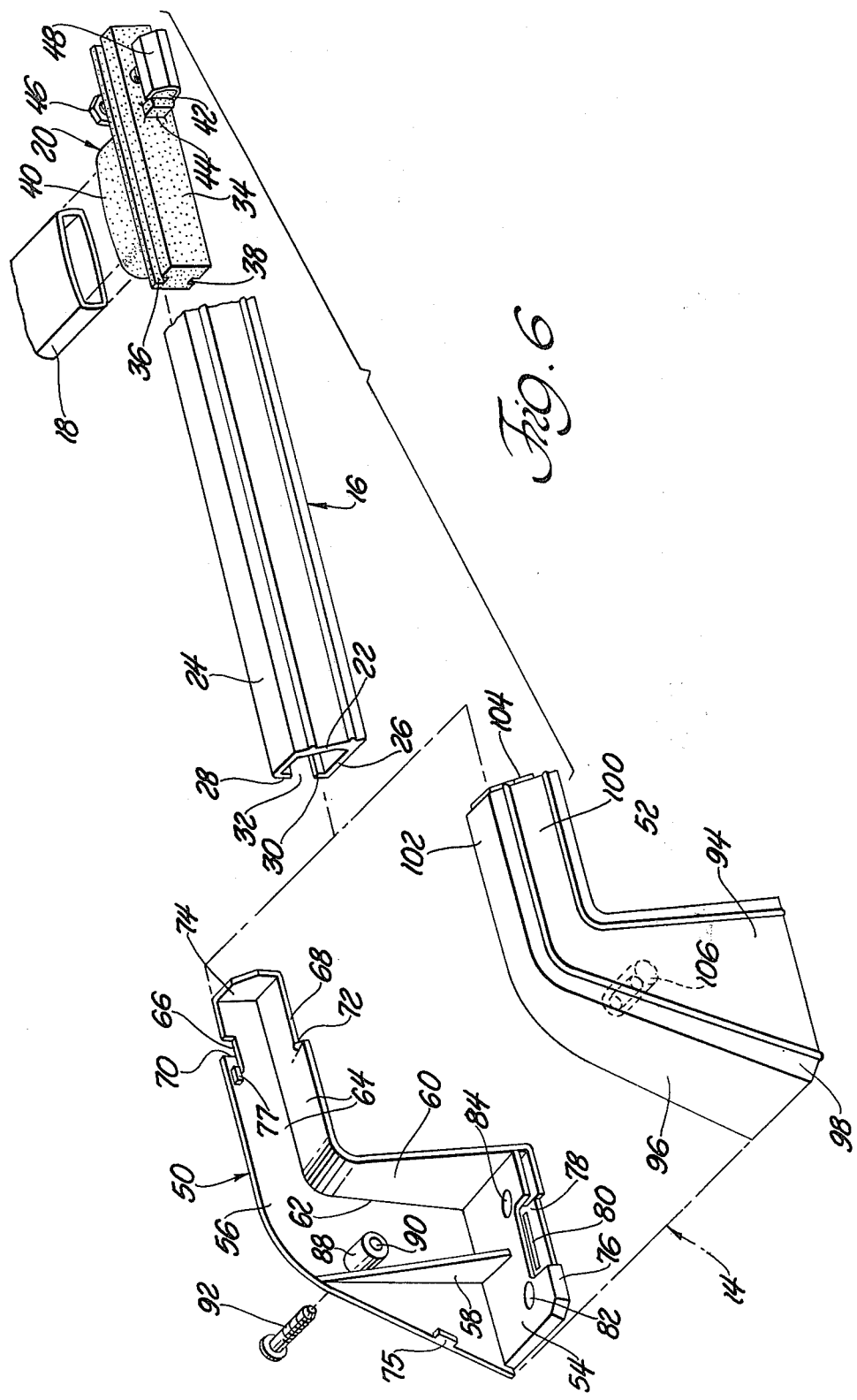
FIG. 6 is an exploded perspective view showing the disassembled stanchion side rail and cross rail mounting device.

Referring to FIG. 1, a carrier assembly is indicated generally at 10 mounted on vehicle surface 12 which, in the illustration, is the roof of a vehicle. Carrier assembly 10 includes an upstanding stanchion member 14, a side rail 16 adapted to be supported by the stanchion above the vehicle surface 12 and a cross rail member 18 supported within the hollow side rail through a wedging and supporting device 20, the latter which is longitudinally adjustable relative to the side rail.

As best seen in FIGS. 3, 5 and 6, side rail 16 is hollow and includes an inwardly sloping outer wall 22, parallel upper and lower walls 24 and 26 and generally vertically disposed inner wall sections 28 and 30 which are vertically spaced to provide a slot 32 extending longitudinally of the interior length of the side rail.

It is preferred that device 20 be formed of a generally one-piece molded plastic material. Device 20 includes a main body section 34 having vertically aligned grooves 36 and 38 which coact with side rail walls 28 and 30 to enable the wedging device to slide longitudinally of the side rail. A hollow boss 40 projects transversely inwardly of the main body section 34 and is adapted to receive the outer end of cross rail 18 enabling the latter to be supported upon the side rail. In order to fix the longitudinal position of the clamping device 20 and hence cross rail 18, a wedging pad 42 is cantilever supported through an arm 44 from main body portion 34 and is of a cross sectional shape which corresponds to interior walls of the side rail with which it is adapted to coact. A screw element 46 is threadably mounted through main body portion 34 and is adapted to engage the inner end of the wedging pad 42 such that as the screw is threaded outwardly into engagement with the wedging pad, the latter wall be wedged against the inside of side rail wall 22 and the reaction force to which wedging movement also moves the main body section 34 inwardly also causing the latter to be wedged against the groove forming walls 28 and 30. In order to provide better gripping engagement with the interior of side rail wall 22, the wedging pad 42 may have a metal sleeve 48 formed thereabout.

Thus, as it is desired to move cross rail 18 longitudinally to compensate for different size loads being carried or retained by the carrier, screw 46 is threaded inwardly or away from side rail 16 to relieve the wedging action of pad 42 and thus enable wedging device 20 and the associated cross rail to be moved longitudinally to a desired position after which the screw may again be threaded outwardly to create the wedging action as previously described and to thereby fix the longitudinal position of the cross rail.

As noted, the supporting device 20 is molded of a hard plastic although other materials may be used if desired. Side rail 16 is preferably a metal extrusion, although here again the part may be rolled, die-cast or shaped by any other conventional forming process.

As particularly noted in FIGS. 1 and 2, stanchion member 14 is formed to give the appearance of a monolithic or one-piece construction wherein the means for supporting the stanchion upon the vehicle surface 12 is hidden. The construction of the stanchion member 14 and the means for mounting the same on the vehicle surface will now be considered in greater detail. As best seen in FIGS. 4 and 6 and while the stanchion gives the appearance of being a monolithic construction, it is, in fact, formed of two coacting portions 50 and 52 which are formed in such a way as to provide two equally strong components.

The first stanchion portion 50 includes a generally rectangular base 54 from the inner edge of which a wall 56 extends upwardly. To reinforce wall 56, a rib 58 may be integrally formed between the wall and base 54. Wall 56 is generally of a planar shape, extends longitudinally o the vehicle surface and is adapted to be aligned with the short vertical walls 28 and 30 of side rail 16 when the side rail is mounted to the stanchion. Stanchion portion 50 includes a second wall 60 which projects upwardly from a transverse edge of base 54 and is integrally joined with longitudinal wall 56 along a common edge 62. The upper portions of walls 56 and 60 project longitudinally beyond base 54 to form an L-shaped section 64, the wall sections of which are respectively vertically and transversely notched at 66 and 68 to permit the outermost portion of section 64 to telescopingly fit within the hollow side rail 16. In thus notching the walls of section 64, shoulders 70 and 72 are provided which provide stops to limit the insertion of section 64 within the side rail.

In order to reinforce the right angularly related walls of section 64, a common end wall 74 is provided and shaped to conform to the interior shape of side rail 16.

Short projections 75 and 77 are formed proximate the top edge of wall 56 is support section 52 when assembled to section 50.

The outer edge 76 of base 54 is formed to provide a transverse recess 78 through which a longitudinal slot 80 is also provided which, as will subsequently be described, coacts with a portion of the second stanchion section 52 to facilitate the connection of the stanchion sections 50 and 52.

A pair of apertures 82 and 84 are formed through base portion 54 and are adapted to receive suitable cap screw elements 86 by which the first stanchion section 50 is fixed to vehicle surface 12 as particularly seen in FIG. 4. A hollow boss 88 is formed on the inner face of wall 56 and includes an unthreaded bore 90 adapted to receive a screw element 92 adapted to be inserted through the bore from the inside of wall 56.

The second stanchion section 52 includes an outer wall 94 which is generally of the same shape as wall 56 of section 50. Section 52 includes a second wall 96 which is generally perpendicular to the first wall 94 and integrally joined therewith along a common edge 98. Walls 94 and 96 also include integral upper wall portions 100 and 102 which project beyond the main walls 94 and 96. When stanchion sections 50 and 52 are assembled, wall portions 100 and 102 longitudinally terminate adjacent shoulders 70 and 72 of section 50. In other words, as best seen in the sectioned portion of FIG. 2, the L-shaped section 64 of stanchion portion 50 extends longitudinally beyond walls 100 and 102 of the second section when the stanchion sections 50 and 52 are joined together. Walls 100 and 102 of section 52 include a short, generally L-shaped projection or guide portion 104 adapted to project within the hollow side rail 16.

As best seen in FIG. 4, a boss element 106 is formed on the inside of wall 94 and is adapted to be transversely aligned with boss 88 of first section 50. A threaded bore is formed within boss 106 and is adapted to receive and be threadably engaged by screw member 92 in order to join the first and second stanchion sections 50 and 52.

In order to facilitate the joining of stanchion sections 50 and 52, and as best seen in FIG. 4, an L-shaped projection 108 is formed at the lower portion of side wall 94 of second section 52 and is adapted to be engaged with longitudinal groove 80 of base 54 of first stanchion portion 50.

As also best seen in FIG. 4, the innermost edge of walls 96 and 102 of section 52 are slightly recessed in order to permit said walls to overlay the upper edge of wall 56 of first stanchion section 50. This arrangement further facilitates the monolithic appearance of the stanchion when sections 50 and 52 are assembled since the seam between the parts is on the interior of the stanchion away from the side normally viewed.

As a further modification of the present invention, it is possible to eliminate wall 60 from stanchion section 50 and add a corresponding third wall to stanchion section 52. In such case the third wall would be disposed opposite wall 96 and would be joined along a common edge with wall 94. In such modification stanchion section 50 would consist of base 54 and upstanding wall 56 while section 52 would include walls 94, 96 and the aforenoted third wall in the location of original wall 60.

Further, while the stanchion walls have been depicted as being planar, it is to be understood that such walls could be non-planar or curvilinear in cross section. In such case the walls would join together at rounded sections rather than at generally right angles as illustrated in the drawings.

In all modifications of the invention, each of the coacting stanchion sections 50 and 52 includes at least two angular related and joined wall portions, e.g. 54–56 and 94–96, and which angulated relationship reinforces and thus strengthens each of the stanchion sections.

Other modifications may be made within the scope of the invention as set forth in the hereinafter appended claims.

What is claimed is:

1. A stanchion for an article carrier of the type including a first section adaped to be secured to a vehicle surface and a second section adapted to be secured to said first section to form a hollow and enclosed stanchion, the improvement comprising:
   (a) the first section including a base, first wall means extending upwardly from not more than one-half of the periphery of said base and leaving the remaining portion of said base periphery unenclosed by said first wall means;
   (b) means for securing said base to said vehicle surface;
   (c) the second section including second upstanding wall means having a lower periphery corresponding in shape and extent to that portion of the base periphery unenclosed by said first wall means; and
   (d) means for detachably joining said first and second sections to form a hollow stanchion whereby said first and second wall means entirely enclose the base of said first section.

2. A stanchion as set forth in claim 1 wherein the means for detachably joining said first and second sections comprises
   (a) an opening through said first wall means;
   (b) an internally threaded boss formed interiorly of said second wall means and coaxially aligned with the first wall means opening; and
   (c) screw means projecting through said opening and threadably engaging the boss to secure together the first and second stanchion sections.

3. A stanchion as set forth in claim 2 wherein the means for detachably joining said first and second sections comprises
   (a) a recess formed in said base; and
   (b) a projection extending laterally from the lower periphery of said second wall means and including a portion adapted to engage with said recess.

4. A stanchion for supporting a longitudinally extending hollow side rail above a vehicle surface, said stanchion being of the type including a first section adapted to be secured to a vehicle surface and a second section adapted to be secured to said first section to form a hollow and enclosed stanchion, the improvement comprising:
   (a) the first section including a base, first wall means extending upwardly from not more than one-half of the periphery of said base and leaving the remaining portion of said base periphery unenclosed by said first wall means;
   (b) means for securing said base to said vehicle surface;
   (c) the second section including second upstanding wall means having a lower periphery corresponding in shape and extent to that portion of the base periphery unenclosed by said first wall means;
   (d) means for detachably joining said first and second sections to form a hollow stanchion whereby said first and second wall means entirely enclose the base of said first section; and
   (e) said first and second wall means each including portions disposed above and projecting longitudinally beyond said base and adapted to extend within said hollow side rail.

5. A stanchion for a vehicle article carrier of the type including a first section adapted to be secured to a vehicle surface and a second section adapted to be secured to said first section to form a hollow and enclosed stanchion, the improvement comprising:
   (a) the first section including a rectangular base, a pair of planar walls extending upwardly from said base, said walls being generally perpendicularly joined along a common edge;
   (b) means for securing said base to said vehicle surface;
   (c) the second section including a pair of upstanding planar walls being generally perpendicularly joined along a common edge; and
   (d) means for detachably joining said first and second sections to form a hollow stanchion whereby said walls entirely enclose the base of said first section.

6. A stanchion for supporting a longitudinally extending hollow side rail above a vehicle surface, said stanchion being of the type including a first section adapted to be secured to the vehicle surface and a second section adapted to be secured to said first section to form a hollow and enclosed stanchion, the improvement comprising:
   (a) the first section including a rectangular base, a pair of planar walls extending upwardly from said base, said walls being generally perpendicularly joined along a common edge;
   (b) means for securing said base to said vehicle surface;
   (c) the second section including a pair of upstanding planar walls being generally perpendicularly joined along a common edge;
   (d) means for detachably joining said first and second sections to form a hollow stanchion whereby said walls entirely enclose the base of said first section; and
   (e) the upper ends of the perpendicularly related walls of said first section extend longitudinally beyond said base and form a generally L-shaped portion adapted to project within and support the hollow side rail.

7. A stanchion for supporting a longitudinally extending hollow side rail above a vehicle surface, said stanchion being of the type including a first section adapted to be secured to a vehicle surface and a second section adapted to be secured to said first section to form a hollow and enclosed stanchion, the improvement comprising:
   (a) the first section including a rectangular base, a pair of planar walls extending upwardly from said base, said walls being generally perpendicularly joined along a common edge;
   (b) means for securing said base to said vehicle surface;
   (c) the second section including a pair of upstanding planar walls being generally perpendicularly joined along a common edge;
   (d) means for detachably joining said first and second sections to form a hollow stanchion whereby said walls entirely enclose the base of said first section; and (e) the upper ends of the perpendicularly related walls of said first and second sections extend longitudinally beyond said base to form respective generally L-shaped portions adapted to project within and support the hollow side rail.

8. A stanchion as set forth in claim 7 wherein the L-shaped longitudinally extending portion of said first section extends longitudinally beyond the L-shaped portion of said second section.

9. A stanchion for a vehicle article carrier of the type including a first body section adapted to be secured to a vehicle surface and a second body section adapted to be secured to said first body section to form a hollow and enclosed stanchion, the improvement comprising:
- (a) the first body section including
  - (1) a rectangular base having a pair of transversely spaced inner and outer edges, a pair of longitudinally spaced inner and outer edges normal to said transverse inner and outer edges,
  - (2) a first wall projecting upwardly from said transverse inner edge,
  - (3) a second wall projecting upwardly from said longitudinal inner edge,
  - (4) said first and second walls being integrally formed with said base and each other;
- (b) means coacting with said base to secure the first body section to said vehicle surface;
- (c) the second body section including
  - (1) a longitudinally and upwardly extending third wall,
  - (2) a transversely and upwardly extending fourth wall,
  - (3) said third and fourth walls being integrally joined;
- (d) said second body section coacting with said first body section whereby the third wall is disposed proximate to and parallel with the outer transverse edge of said base section and said fourth wall is disposed proximate to and parallel with the outer longitudinal edge of said base section such that said first body section and second body section walls entirely enclose the first body section base and the means securing said body section to the vehicle surface; and
- (e) means for removably securing said second body section to said first body section.

10. A stanchion as set forth in claim 9 wherein the means for removably securing said second body section to said first body section comprises:
- (a) a boss extending transversely inwardly from the third wall of the cap member, a threaded bore formed in said boss and open only at the inner end thereof;
- (b) an opening formed in the first wall of the main body section and coaxial with the bore of said boss; and
- (c) a member extending through said first wall opening and threadably engaging the boss bore to secure the cap member to the main body section.

* * * * *